United States Patent
Tamaru et al.

(10) Patent No.: US 7,172,257 B2
(45) Date of Patent: Feb. 6, 2007

(54) CRAWLER TRACK TENSION ADJUSTING DEVICE

(75) Inventors: Masatake Tamaru, Ibaraki (JP); Teiji Yamamoto, Kadoma (JP); Shigeru Yamamoto, Hirakata (JP)

(73) Assignee: Komatsu Ltd., Tokyo (JP)

( * ) Notice: Subject to any disclaimer, the term of this patent is extended or adjusted under 35 U.S.C. 154(b) by 82 days.

(21) Appl. No.: 10/806,824

(22) Filed: Mar. 23, 2004

(65) Prior Publication Data
US 2005/0035654 A1  Feb. 17, 2005

(30) Foreign Application Priority Data
Mar. 31, 2003  (JP)  ............................. 2003-094499
Feb. 20, 2004  (JP)  ............................. 2004-043928

(51) Int. Cl.
*F16J 1/10* (2006.01)
*B62D 55/14* (2006.01)

(52) U.S. Cl. ...................................... 305/145; 305/125

(58) Field of Classification Search ........ 305/125–128, 305/131–134, 143–145, 148–149
See application file for complete search history.

(56) References Cited

U.S. PATENT DOCUMENTS

| | | | | |
|---|---|---|---|---|
| 3,972,569 A | * | 8/1976 | Bricknell | ..................... 305/144 |
| 4,981,199 A | * | 1/1991 | Tsai | ............................. 188/312 |
| 5,960,694 A | * | 10/1999 | Thomas et al. | ........... 91/363 R |
| 5,984,436 A | * | 11/1999 | Hall | ............................. 305/145 |
| 6,055,809 A | * | 5/2000 | Kishi et al. | ..................... 60/475 |
| 6,126,401 A | * | 10/2000 | Latham | ......................... 417/16 |
| 6,224,172 B1 | * | 5/2001 | Goodwin | ..................... 305/145 |
| 6,276,768 B1 | | 8/2001 | Miller | |
| 6,280,010 B1 | | 8/2001 | Oertley | |
| 6,305,762 B1 | * | 10/2001 | Oertley | ........................ 305/145 |
| 6,354,678 B1 | | 3/2002 | Oertley | |
| 2003/0117017 A1 | * | 6/2003 | Hoff | ............................. 305/143 |
| 2005/0029866 A1 | * | 2/2005 | Tamaru et al. | ............... 305/125 |

FOREIGN PATENT DOCUMENTS

| | | |
|---|---|---|
| JP | 7-144668 A | 6/1995 |
| JP | 2000-247273 A | 9/2000 |
| JP | 2001-206261 A | 7/2001 |

* cited by examiner

*Primary Examiner*—Jason R. Bellinger
(74) *Attorney, Agent, or Firm*—Frishauf, Holtz, Goodman & Chick, P.C.

(57) ABSTRACT

A crawler track tension adjusting device is provided in which a driving unit having a closed structure carries out automatic tension adjustment in response to a control signal to create optimum tension on a crawler belt. The crawler track tension adjusting device includes a tension adjusting cylinder which is operable to control the tension and is actuated by a hydraulic pump that is driven by a motor. An electromagnetic direction selector valve is disposed in an oil pipeline for connecting the hydraulic pump to the tension adjusting cylinder, and a hydraulic sensor for detecting the operating condition of the tension adjusting cylinder is disposed in the hydraulic circuit in which the tension adjusting cylinder, the hydraulic pump and the selector valve are provided. The hydraulic sensor is connected to a controller to operate the hydraulic pump and the direction selector valve so as to control the tension adjusting cylinder.

12 Claims, 5 Drawing Sheets

CRAWLER TRACK TENSION ADJUSTING DEVICE

TECHNICAL FIELD

The present invention relates to a crawler track tension adjusting device (track adjuster) for adjusting the tension of a crawler track of a track-type work machine such as a bulldozer during traveling.

BACKGROUND ART

A known track-type work machine has crawler belts each of which is wrapped around a driving sprocket rotatively driven by a power from a driving source supported by a main frame and around an idler movably supported by the main frame. The crawler belts are each guidingly supported by track rollers at the ground engaging side and by track carrier rollers at the ground unengaging side. For creating tension in the crawler belts, a track tensioning mechanism of the coil spring type or hydraulic cylinder type is interposed between a yoke for supporting a bearing for the idler and a track frame. The crawler belts are constructed by coupling a plurality of track links and therefore, slack is created because the track link components (e.g., links and bushings) and idlers begin to wear over a period of time. Therefore, there arises a need to increase tension on the crawler belts in order to eliminate slack in the crawler belts.

A means for increasing the tension of crawler belts is disclosed in Japanese Patent Kokai Publication No. 7-144668. According to the track adjuster disclosed in Japanese Patent Kokai Publication No. 7-144668, grease is manually injected into a grease chamber of a grease cylinder to adjust the tension of the crawler belts.

Another track adjuster is disclosed in Japanese Patent Kokai Publication No. 2000-247273. According to this publication, the track adjuster including hydraulic cylinders (adjuster cylinders) is used for adjusting tension on a crawler belt provided on both sides of a work machine. This track adjuster is provided with an adjuster cylinder control circuit which is operated so as to properly absorb stroke fluctuations when a load is imposed on both of the hydraulic cylinders and when a load is imposed on either of the hydraulic cylinders.

An arrangement for optimizing adjustment of the tension of crawler belts by hydraulic cylinders is disclosed in Japanese Patent Publication No. 2001-206261.

The track adjuster of Japanese Patent Kokai Publication No. 7-144668 has revealed the following problems. (1) Since the operator makes an adjustment using grease, it is impossible to fit the tension of the crawler belts to both situations, that is, the situation where the work machine is in a forward movement and therefore the crawler belts may be relatively loosened and the situation where the work machine is in a backward movement and therefore the crawler belts should be tightly stretched. The use of this track adjuster causes a decrease in the efficiency associated with operation of the work machine. (2) If a crawler belt bites foreign materials such as rocks during vehicle traveling or if earth and sand penetrate into and deposit on the tooth roots of a driving sprocket, causing abnormal tension on the crawler belt, the load on the coil spring increases, imposing a heavy load on every parts of the track frame. In view of this, the work machine needs a sturdy structure, which leads to an increase in vehicle weight and therefore additional cost. (3) When the aforesaid biting state is cleared, the accumulated energy of the coil spring is released all at once. The components of the crawler belts are, therefore, required to have enough strength to withstand the impulsive load occurring at that time, which leads to an increase in the weight of the components and therefore additional cost. (4) Since the size of the coil spring is dependent of the material used, miniaturization of the coils spring is difficult. Therefore, the track frame which houses the coil spring is required to be large in size. This hampers an improvement in the soil removing capability of the work machine.

Track adjusters utilizing hydraulic cylinders such as disclosed in Japanese Patent Kokai Publication No. 2000-247273 are operated by an incompressible fluid unlike the coil spring type tensioning mechanisms and therefore require an accumulator. For ensuring the reliability of the piping system, the accumulator needs to be periodically charged with gas and periodical piping (hydraulic hoses) replacement becomes necessary. In addition, it is necessary to run piping from the hydraulic driving source to the undercarriage assembly in which the track adjuster is incorporated, and the space for accommodating the hydraulic piping (mainly hydraulic hoses) is needed, which is accompanied with many problems in manufacturing.

The track adjuster utilizing hydraulic cylinders according to Japanese Patent Kokai Publication No. 2001-206261 is designed to have a positional sensor used in control performed in synchronization with the expansion/contraction of the crawler belts. Such a control system is seemingly rational, but imposes the following problem: Since work machines such as bulldozers are usually operated on the unleveled ground and therefore contaminated with earth and sand at their crawler units, the light beam of the sensor is likely to be cut off by earth and sand during operation in cases where a general photoelectric sensor is used as a high-precision positional sensor. Therefore, such a sensor lacks accuracy. Even when a bobbin-shaped scale is used as a means for measuring distance in addition to the laser, if earth and sand penetrate into the measuring part during measurement (operation), the measuring function will be hampered, so that intended aims cannot be accomplished. Further, in this track adjuster, the right and left crawler belts need to be separately adjusted. Therefore, running of hydraulic conduits from the vehicle body to the undercarriage for the purpose of piping from the hydraulic driving system (i.e., the driving source for the track unit and other instruments disposed on the main frame for performing control) to the hydraulic cylinders gives rise to difficulties in reservation of a route, as pointed out earlier. This causes many problems not only in manufacturing but also in maintenance.

The invention is directed to overcoming the foregoing shortcomings and a primary object of the invention is therefore to provide a crawler track tension adjusting device in which a control operation mechanism is operated by a driving unit of a closed structure and the tension of crawler belts is automatically adjusted in response to a control signal to optimize it.

DISCLOSURE OF THE INVENTION

The above object can be accomplished by a crawler track tension adjusting device according to the invention comprising:

(a) a hydraulic actuator which is operated in a direction to increase tension on a crawler belt and in a direction to decrease tension on the crawler belt under the same condition;

(b) an electric motor;

(c) a hydraulic pump actuated by the electric motor; and (d) operating condition detecting means disposed in a hydraulic circuit which connects the hydraulic pump to the hydraulic actuator, for detecting the operating condition of the hydraulic actuator, wherein the electric motor is controlled according to a signal from the operating condition detecting means.

According to the invention, the hydraulic actuator is activated and operated by pressure oil fed by the hydraulic pump driven by the electric motor. The operating condition detecting means is incorporated in the hydraulic circuit connected to the hydraulic actuator and adjustment of the tension of the crawler belt is carried out through the hydraulic actuator in accordance with a detection signal issued from the operating condition detecting means, so that the tension of the crawler belt optimum for the operations in forward and backward directions can be attained without bothering the operator. As a result, tension on the crawler belt due to wear of the bushings and coupling pins that constitute the crawler unit can be automatically adjusted for optimization.

In the invention, the hydraulic actuator is preferably a double rod cylinder comprised of a cylinder, a piston slidable within the cylinder, and a piston rod having portions disposed at the front and rear ends, respectively, of the piston. Preferably, the front portion of the piston rod projects forwardly from the cylinder so as to be coupled to a yoke for supporting an idler which the crawler belt encircles, and the pressure active area of a front pressure chamber located in front of the piston is equal to the pressure active area of a rear pressure chamber located behind the piston. With such an arrangement, when the piston moves forwardly or backwardly, receiving the pressure oil from the hydraulic pump, the inflow and outflow of the pressure oil become equal to each other in both forward and backward directions, so that the movement of the piston becomes equal to the inflow (or outflow) of the pressure oil irrespective of the moving direction, facilitating the control of the hydraulic actuator. A small tank can be used for storing the operating oil because it only needs capacity sufficient for absorbing the expansion of the operating oil caused by temperature changes.

In the invention, an electromagnetic direction selector valve is disposed in an oil line which connects the hydraulic pump to the hydraulic actuator, and a hydraulic sensor is disposed as the above operating condition detecting means in an oil line which connects the direction selector valve to the hydraulic actuator. In response to a signal from the hydraulic sensor, a controller disposed on the side of the main frame controls the hydraulic pump through the electric motor and controls the direction selector valve. With this arrangement, the tension of the crawler belt can be detected by the hydraulic sensor through the hydraulic actuator and the direction selector valve is operated based on a detection signal from the hydraulic sensor to move the hydraulic actuator forward or backward in accordance with the tension of the crawler belt. Thus, automatic tension adjustment can be done. In this way, the tension load of the crawler belt is kept by hydraulic pressure, so that the crawler track tension adjusting device of the invention can be made small in size, compared to the conventional coil spring type track adjusters. This contributes to a reduction in the size of the track frame which houses the crawler track tension adjusting device.

The hydraulic pump may be a bidirectional pump, and the hydraulic sensor serving as the operating condition detecting means may be disposed in an oil line which connects this hydraulic pump to the hydraulic actuator. The controller disposed on the main frame side may control the hydraulic pump through the electric motor, in response to a signal from the hydraulic sensor. With this arrangement, the hydraulic actuator can be moved forward and backward by the forward/reverse rotation of the hydraulic pump in accordance with the tension of the crawler belt, thereby automatically adjusting the tension of the crawler belt.

It is preferable to integrally attach the operating oil tank to the hydraulic pump. The hydraulic circuit including the hydraulic actuator, the direction selector valve and the hydraulic pump has a closed structure in which all the parts are hermetically closed. This structure obviates the need to connect the crawler track tension adjusting device to the hydraulic driving source, which eliminates the use of long hydraulic hoses and therefore markedly reduces the risk of oil leakage caused by vibration or the like. In addition, the crawler track tension adjusting device can be unitized in a small size without use of piping materials such as hydraulic hoses, so that there is no need to take account of a piping space. As a result, the degree of freedom of the vehicle structure increases and machining can be facilitated.

Further, a stroke sensor for detecting the position of the piston rod may be so disposed as to face an end of the piston rod, which end is opposite to the end facing the yoke. A positional signal issued by the stroke sensor may be input to the controller. This has such an advantage that the tension of the crawler belt can be detected independently of or simultaneously with an issue of a signal by the hydraulic sensor. Additionally, since the stroke sensor is integrally incorporated in the hydraulic actuator, it can be installed in the track frame unsusceptible to contamination with earth and sand and therefore external influences can be eliminated to enable correct signal transmission.

In the invention, the crawler track tension adjusting device is preferably housed in a casing and two such casings are accommodated in track frames for supporting crawler units, respectively, provided at the right and left sides of the vehicle. Thanks to this arrangement, the crawler track tension adjusting device can be arranged in a compact form and the tension adjusting portion of the crawler belt can be incorporated in a tubular interior part of the track frame of the main frame of a work vehicle equipped with crawler units such as a bulldozer. As a result, the size of the track frame can be reduced, leading to an improvement in the soil removing capability. In contrast with the conventional track adjusters constructed by assembling parts, the crawler track tension adjusting device of the invention is set up as a unit and therefore the efficiency of assembling it into the vehicle body can be remarkably improved. In addition, the parts of the crawler track tension adjusting device are all integrally formed and the device is connected to external parts only through control/driving system wires except the connection to the yoke of the idler. This advantageously simplifies the connection of the crawler track tension adjusting device to the driving system of the vehicle and facilitates maintenance. The crawler track tension adjusting devices provided at the right and left sides can be independently controlled according to the traveling condition of the work machine so as to provide optimum track tension.

BRIEF DESCRIPTIONS OF THE INVENTION

Figure 4:
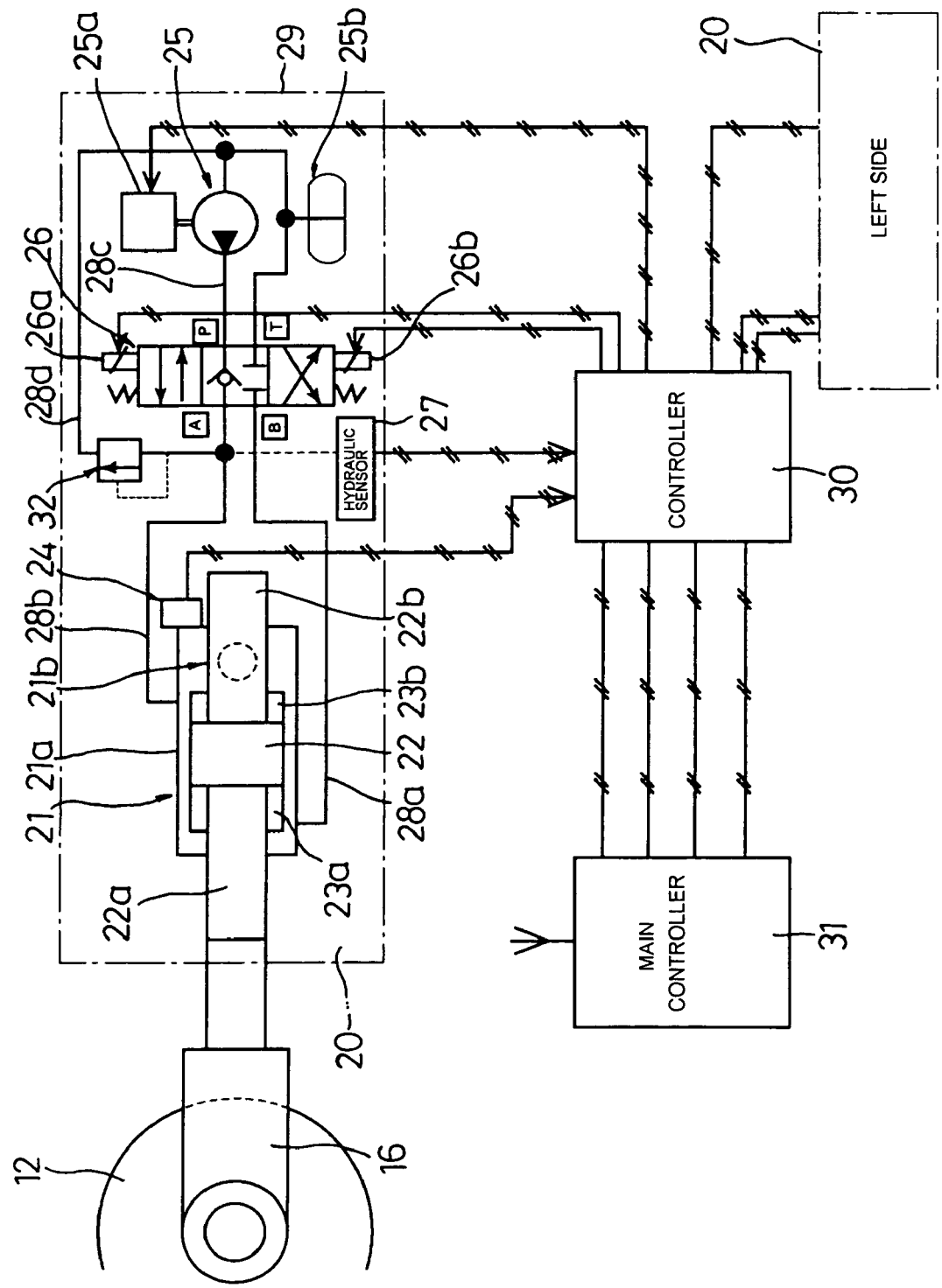

FIG. 4 diagrammatically shows the crawler track tension adjusting device of the first embodiment and its control unit.

Figure 5:
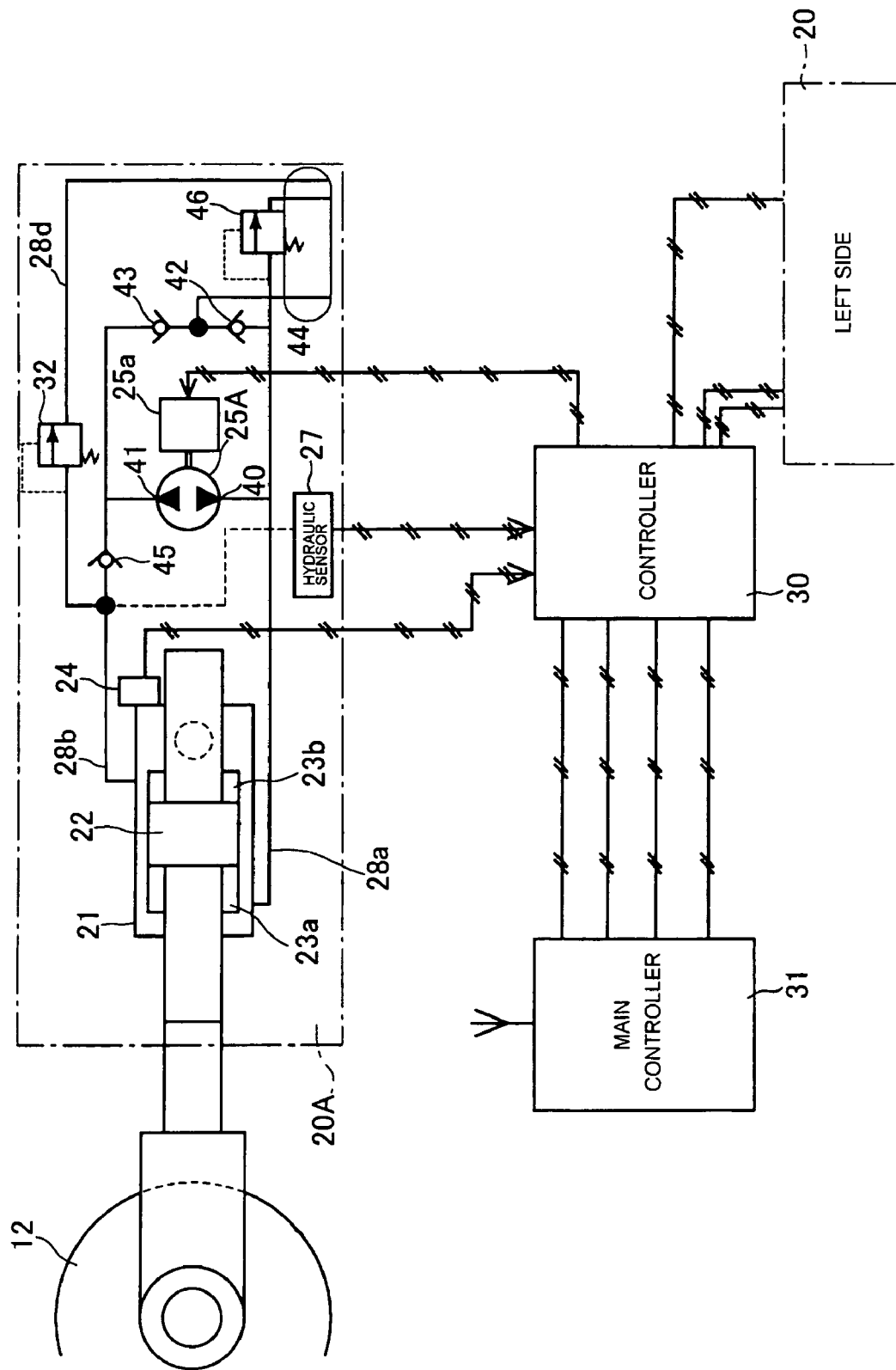

FIG. 5 diagrammatically shows a control unit of a crawler track tension adjusting device constructed according to a second embodiment.

BEST MODE FOR CARRYING OUT THE INVENTION

Referring now to the accompanying drawings, a crawler track tension adjusting device (hereinafter referred to as "track adjuster") will be described according to preferred embodiments of the invention.

Figure 1:
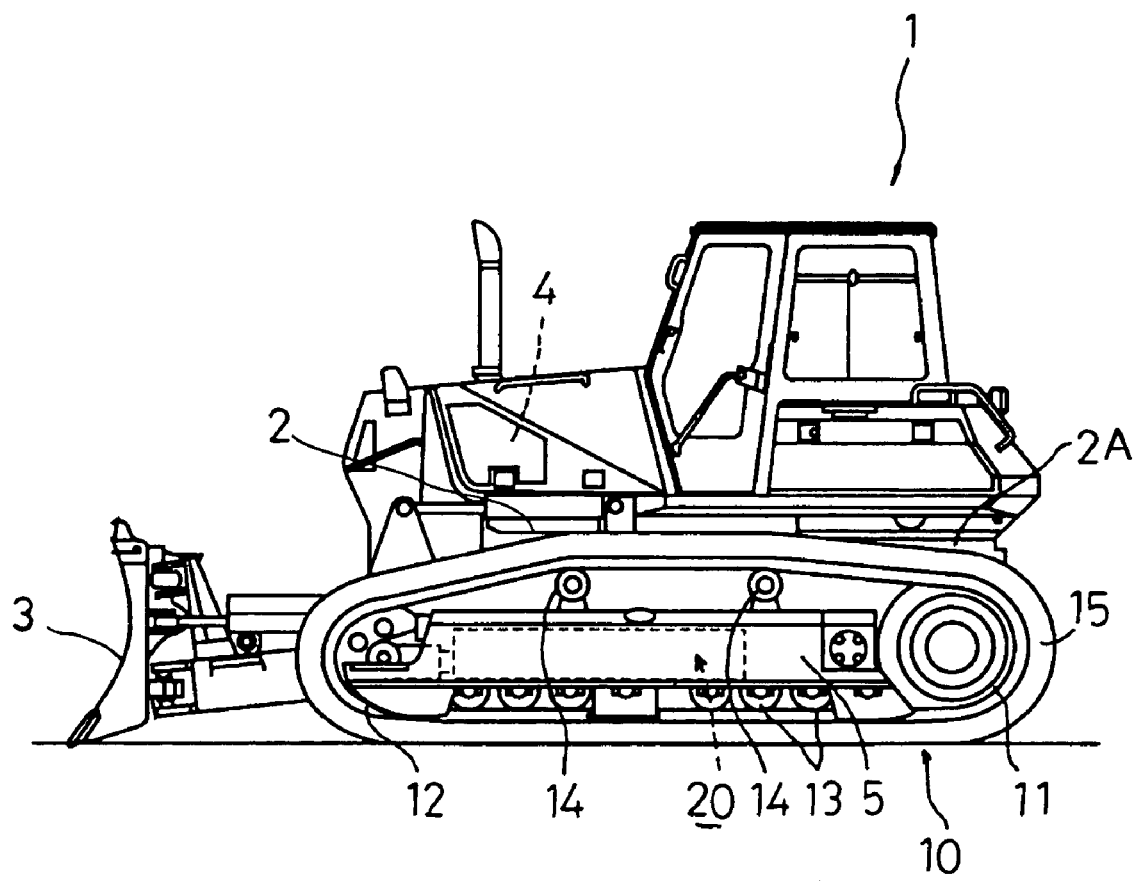
FIG. 1 is a side view of a work machine equipped with crawler track tension adjusting devices constructed according to a first embodiment of the invention.
Figure 2:
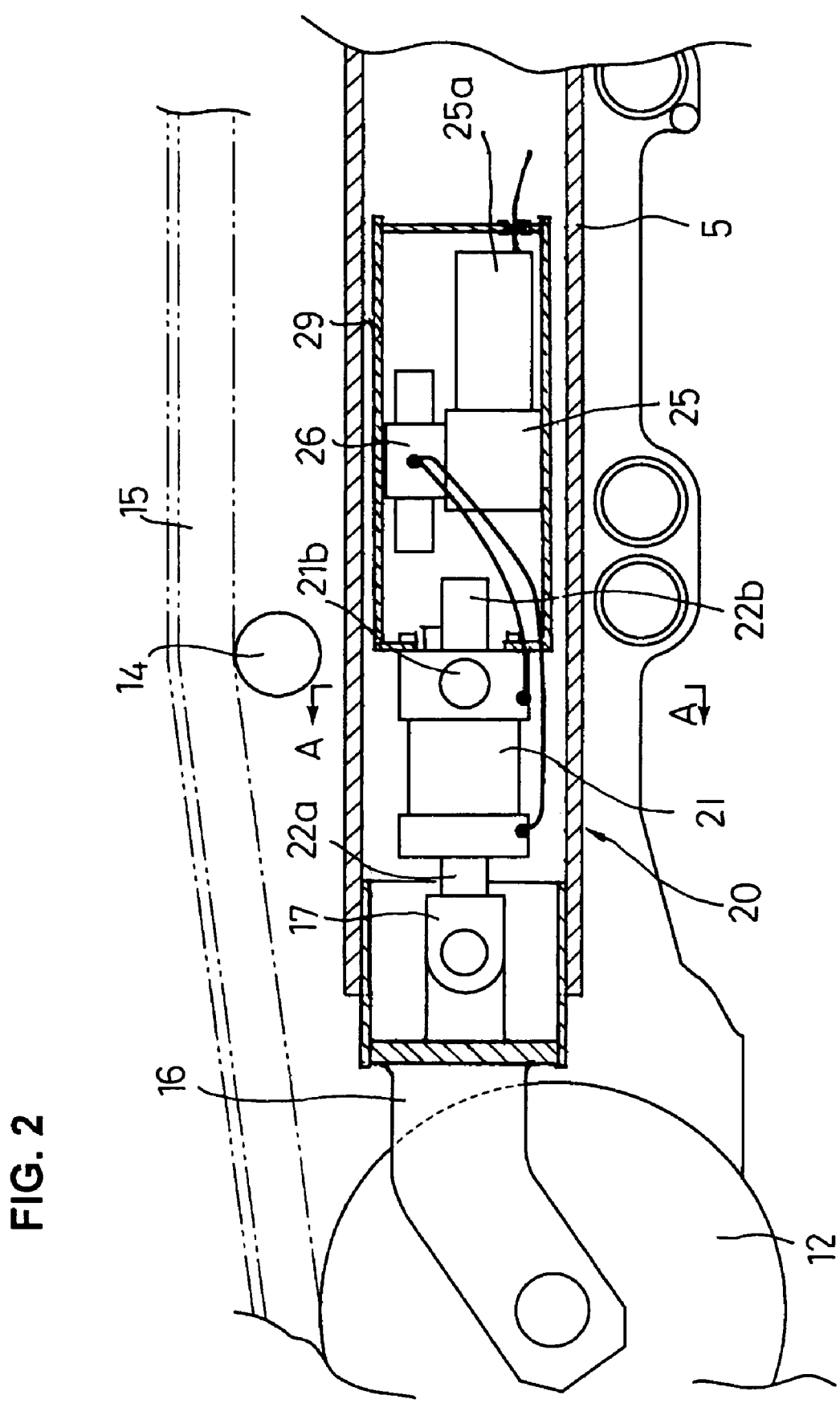
FIG. 2 is a longitudinal sectional view of the crawler track tension adjusting device of the first embodiment.
Figure 3:
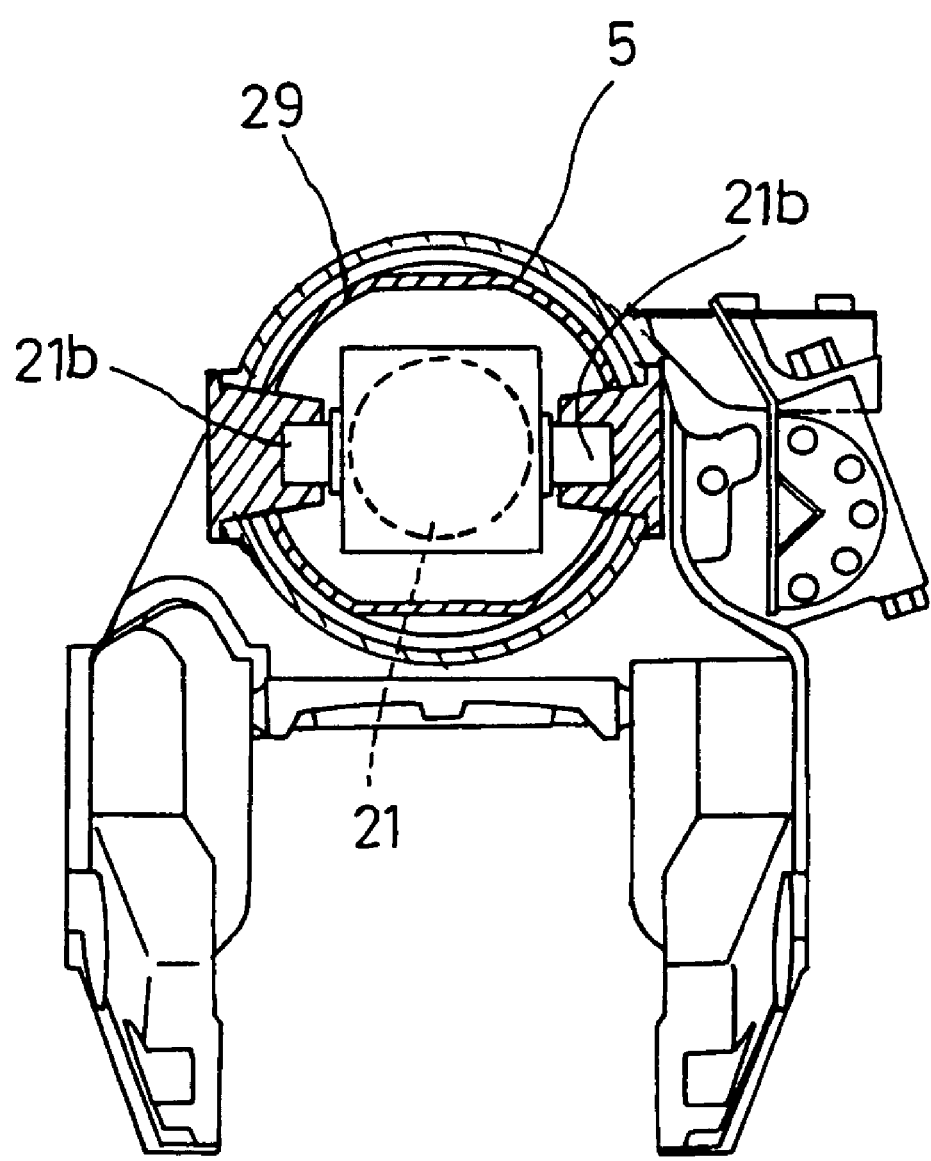
FIG. 3 is a sectional view taken along line A—A of FIG. 2.

FIG. 1 is a side view of a work machine equipped with track adjusters constructed according to a first embodiment of the invention. FIG. 2 is a longitudinal sectional view of the track adjuster of the first embodiment. FIG. 3 is a sectional view taken along line A—A of FIG. 2. FIG. 4 diagrammatically shows the track adjuster of the first embodiment and its control unit.

The first embodiment is associated with a track adjuster which is applied to a bulldozer 1 shown in FIG. 1, the bulldozer 1 serving as a track-type work machine for use in operations such as earth moving and ripping. The bulldozer 1 includes work implements such as a blade 3 and a ripper (not shown) which are operated by a hydraulic drive. In the bulldozer 1, an engine 4 is mounted on a vehicle body 2, for activating the blade 3 and the ripper and making the vehicle move. This bulldozer 1 has a crawler unit 10 on both sides of a main frame 2A.

Each crawler unit 10 has (i) a driving sprocket 11 located at the rear end of the main frame 2A, (ii) an idler 12 located at the front end, (iii) a plurality of track rollers 13 disposed in the lower part of the intermediate portion, (iv) track carrier rollers 14 disposed in the upper part of the intermediate portion, and (v) an endless crawler belt 15 wrapped around the driving sprocket 11 and the idler 12. The endless crawler belt 15 is held at the middle part thereof by the track rollers 13 and the track carrier rollers 14. A driving force is transmitted from a hydraulic power unit (not shown) mounted on the vehicle body 2 to the driving sprocket 11, thereby actuating the driving sprocket 11 to make the vehicle move. The crawler belt 15 is constructed in an endless form by sequentially coupling a multiplicity of track links with coupling pins, each track link having a track shoe attached thereto.

Each crawler unit 10 has a track adjuster 20 for adjusting the tension of the crawler belt 15 so as to take up the slack of the crawler belt 15 caused by wear of the coupling pins and bushings for the track links during vehicle traveling and to prevent an increase in the load caused by rocks and stones bitten by the crawler track 15. The right and left track adjusters 20 are positioned relative to their corresponding idlers 12 located in front of the right and left track adjusters 20. As the right/left crawler units 10 and the right/left track adjusters 20 are both symmetrically formed, only one of them will be hereinafter described.

As shown in FIGS. 2 and 3, the track adjuster 20 is inserted into a track frame 5 disposed at both sides of the main frame 2A of the work machine. The track adjuster 20 is designed to be operated with its front end being directly coupled to the movably supported idler 12. The track adjuster 20 is comprised of a tension adjusting cylinder (hydraulic actuator) 21, a hydraulic pump 25 driven by an electric motor 25a, an electromagnetic direction selector valve 26, a hydraulic sensor 27 and a hydraulic circuit which has a closed structure (closed circuit) for hermetically closing all the parts. These members are housed in a tubular casing 29 as a unit. The track adjuster 20 is inserted into the tubular track frame 5 and the rod of the tension adjusting cylinder 21 is connected to the rear end of the yoke 16 for supporting the idler 12 to operate the yoke 16.

As shown in FIG. 4, the tension adjusting cylinder 21 is a double rod cylinder formed such that a piston rod front end portion 22a and a piston rod rear end portion 22b project from a cylinder head with respect to a piston 22 that is slidable in a pressure chamber formed in a cylinder body (hydraulic actuator body) 21a. Front and rear pressure chambers 23a, 23b partitioned by the piston 22 are formed such that the pressure active area of the pressure chamber 23a is equal to the pressure active area of the pressure chamber 23b. Consequently, the displacement of the tension adjusting cylinder 21 in a direction to tighten the crawler belt 15 becomes equivalent to the displacement of it in a direction to loosen the crawler belt 15 on the basis of the inflow and outflow of operating oil. In addition, since the inflow and outflow of operating oil become equal to each other in the displacement of the tension adjusting cylinder 21 in both directions, there is substantially no need for an operating oil tank 25b to have a capacity for buffering the activation of the tension adjusting cylinder 21. Therefore, a tank having small capacity can be used as the operating oil tank 25b. The piston rod front end portion 22a is connected to the shaft end of the yoke 16 by means of a hinge 17, which yoke 16 slidably supports the idler 12. The rear part of the cylinder head is provided with a cylinder stroke sensor 24 which is opposed to the piston rod rear end portion 22b. The cylinder stroke sensor 24 measures the forward/backward movements of the piston rod rear end portion 22b and issues a movement signal (positional signal) to a controller 30 disposed in place in the main frame 2A. This cylinder stroke sensor 24 is utilized for detecting the tension of the crawler belt 15. The tension adjusting cylinder 21 is supported by a trunnion 21b and immediately acts in response to the displacement of the idler 12 in an upward or downward direction. The cylinder stroke sensor 24 may be arranged relative to the piston rod front end portion 22a.

The hydraulic pump 25 is directly connected to the electric motor 25a and constructed in the form of a pump unit to which the enclosed-type operating oil tank 25b is integrally attached. Pipe lines 28a, 28b are connected to the front pressure chamber 23a and rear pressure chamber 23b, respectively, of the tension adjusting cylinder 21. The pipe lines 28a, 28b are also connected to the discharge opening of the hydraulic pump 25 by a pipe line 28c. In the middle of the pipe line 28c, a three position-four port type electromagnetic direction selector valve (hereinafter referred to as "a direction selector valve") 26 is provided. In the middle of the pipe line 28b which connects the outlet side of the hydraulic pump 25 to the rear pressure chamber 23b of the tension adjusting cylinder 21, a hydraulic sensor (operating condition detecting means) 27 is disposed. The pipe line 28b, which connects the outlet side of the hydraulic pump 25 to the rear pressure chamber 23b of the tension adjusting cylinder 21, is provided with a bypass 28d which is, in turn, connected to the suction side (the operating oil tank 25b side) of the pump. Inserted into the bypass 28d is a relief valve 32 for pushing the pressure oil back to the suction side in the event of an abnormal rise in pressure.

The front and rear pressure chambers 23a, 23b of the tension adjusting cylinder 21 are connected to the hydraulic pump 25 and the operating oil tank 25b by the closed hydraulic circuit and designed to function as an independent hydraulic actuator. These parts are housed as a unit in the casing 29 having such an outside dimension that the casing 29 can be inserted in the tubular track frame 5. Since the track adjuster 20 has such a structure, it can be independently hydraulically driven without being connected to the hydraulic driving source located in the vehicle body.

The track adjuster 20 having a unit construction is structured such that the piston rod front end portion 22a of the tension adjusting cylinder 21 is inserted into the tubular track frame 5 from its rear end (the driving sprocket side) so as to face the idler 12 side, and the piston rod front end portion 22a is coupled, by the hinge 17, to the end of the yoke 16 supporting the idler 12.

In the track adjuster 20 inserted and installed in the track frame 5, detection signal generators such as the hydraulic sensor 27 and the cylinder stroke sensor 24 are electrically connected to the controller 30 for tension adjustment as grammatically shown in FIG. 4, the controller 30 adjoining a main controller 31 disposed in place in the vehicle body. A means for issuing a command signal to the electric motor 25a for the hydraulic pump 25 and solenoid portions 26a, 26b of the direction selector valve 26 is also connected to the controller 30. In the operation unit of the controller 30, comparison operation is performed by use of previously input data to release a command signal to specified parts according to the situation. What should be connected to the track adjuster 20 from the vehicle body side is only control signal lines connected to the parts (the direction selector valve 26, the hydraulic sensor 27 and the cylinder stroke sensor 24) and a power line connected to the electric motor 25a. Accordingly, the track frame 5 does not require connection openings more than necessary and therefore can be made small in size without being accompanied with a decrease in strength.

In the track adjuster 20 of the invention having the above structure, when the electro-hydraulic pump (motor-driven hydraulic pump) 25 is activated to supply pressure oil through a direction selector valve 26 which has been switched so as to make the pipe line 28b communicate with the pipe line 28c, the pipe line 28b being connected to the rear pressure chamber 23b of the tension adjusting cylinder 21, the piston 22 of the tension adjusting cylinder 21 moves forward, thereby pushing the support yoke 16 with the piston rod front end portion 22a to make the idler 12 move forward. In this way, a desired tensioning force is given to the crawler belt 15 wrapped around the idler 12.

In a normal condition, the direction selector valve 26 is kept at the neutral position and the steady-state position of the tension adjusting cylinder 21 is detected at its piston rod rear end portion 22b by the cylinder stroke sensor 24. If it is determined from a positional signal sent from the cylinder stroke sensor 24 to the controller 30 that the position of the piston rod rear end portion 22b is in a preset range, the supply of pressure oil from the hydraulic pump 25 is stopped and equilibrium is established in this state. If the discharge pressure of the hydraulic pump 25 is in a preset range, the rotational speed of the hydraulic pump 25 decreases so that the hydraulic pump 25 operates only when necessary to replenish pressure oil the amount of which corresponds to a leakage from the valve. Thus, power consumption can be reduced.

The hydraulic pressure in the rear pressure chamber 23b of the tension adjusting cylinder 21 is constantly detected by the hydraulic sensor 27 disposed in the pipe line 28b and its detection signal is sent to the controller 30 to be compared to previously input data in the operation unit of the controller 30. If the deviation obtained from the comparison falls within a specified range, the detected hydraulic pressure is considered to be normal and maintained without change. In other words, the tension of the crawler belt 15 is maintained just as it is.

As the coupling pins and bushings at the coupling parts of the track links wear owing to accumulated traveling distance, the crawler belt 15 slacks and the pressure of the rear pressure chamber 23b of the tension adjusting cylinder 21 imposed upon the idler 12 varies. A decrease in the pressure is detected by the hydraulic sensor 27. If the pressure data sent to the controller 30 becomes lower than a specified value, a signal for operating the solenoid 26b of the direction selector valve 26 is released from the controller 30. Then, the direction selector valve 26 is switched such that a port P communicates with a port A and a port T communicates with a port B. At the same time, a driving signal is sent to the electric motor 25a for the hydraulic pump 25 which is in turn operated to supply pressure oil to the rear pressure chamber 23b of the tension adjusting cylinder 21. By doing so, the piston 22 and the piston rod advance, thereby moving the idler 12 forward through the yoke 16 connected to the piston rod front end portion 22a to tighten the crawler belt 15 wrapped around the idler 12. After the controller 30 confirms that the pressure data detected by the hydraulic sensor 27 has reached the preset pressure value, the direction selector valve 26 returns to its neutral position while the operation of the hydraulic pump 25 is stopped and the piston rod is kept in its advancing state. After pressure oil is fed to the rear pressure chamber 23b of the tension adjusting cylinder 21 and the piston 22 advances, the operating oil within the front pressure chamber 23a flows back to the operating oil tank 25b connected to the pipe line 28a by way of the direction selector valve 26 and the pipe line 28a.

If the crawler belt 15 bites or runs on a rock during vehicle traveling so that a load is abruptly imposed on the crawler belt 15, the hydraulic sensor 27 detects a sharp rise in the pressure within the rear pressure chamber 23b of the tension adjusting cylinder 21 to release a signal indicative of a pressure rise to the controller 30. In the controller 30, comparison operation is performed to issue an operation signal to the solenoid 26a of the direction selector valve 26 while a drive signal is released to the electric motor 25a for the hydraulic pump 25 so that the hydraulic pump 25 is activated to feed pressure oil to the front pressure chamber 23a of the tension adjusting cylinder 21. Specifically, when the solenoid 26a of the direction selector valve 26 is energized, a spool is switched so that the port B is connected to the port P while the port A is connected to the port T. Pressure oil is sent from the hydraulic pump 25 to the front pressure chamber 23a of the tension adjusting cylinder 21 by way of the port B, while the pressure oil in the rear pressure chamber 23b is put back to the operating oil tank 25b. By doing so, the piston rod of the tension adjusting cylinder 21 moves backward, whereby the idler 12 is withdrawn through the yoke 16 connected to the piston rod front end portion 22a and the tension imposed on the crawler belt 15 when it is tightened is reduced. At that moment, the abrupt load upon the crawler belt 15 is released.

After the load imposed on the crawler belt 15 is thus eliminated, the removal of a rock or the like bitten by the crawler belt 15 reduces the tension, so that the hydraulic sensor 27 releases a detection signal to the controller 30 as described earlier. The controller 30 then issues a signal to the direction selector valve 26 and the electric motor 25a, instructing them to allow feeding of pressure oil to the rear pressure chamber 22b of the tension adjusting cylinder 21. In consequence, the piston rod of the tension adjusting cylinder 21 starts to advance, thereby imparting tensioning force to the crawler belt 15 again. As a matter of course, the tension of the crawler belt 15 at that time is controlled so as to be brought into an adequate condition by the comparison between the data detected by the hydraulic sensor 27 and the data stored in the memory of the controller 30.

In the track adjuster 20 of the present embodiment, the tension of the crawler belt 15 during vehicle traveling is thus detected by the incorporated hydraulic sensor 27, and according to the detected data, the hydraulic pump 25 and the direction selector valve 26 are controlled by the controller 30 to automatically move the tension adjusting cylinder 21 in a forward or backward direction, whereby the tension of the crawler belt 15 is kept in its optimum condition. This operation is automatically carried out in the crawler unit 10 located at the right and left sides of the vehicle body, and therefore, the tension of the right and left crawler belts 15 can be properly maintained in accordance with the driving condition. This eliminates the risk that tension in the crawler belts 15 abnormally increases or the crawler belts 15 are slackened, causing "pitch jumping". As a result, a progress of wear of the component parts of the coupling section can be restricted to enable long use. In addition, since the tension of the crawler belt 15 is detected and controlled based on detection of pressure changes in the hydraulic cylinder (tension adjusting cylinder 21), there is no fear that foreign substance may get into the control system from outside, causing troubles, so that reliable control can be ensured. Consequently, optimum crawler belt tension can be automatically maintained.

Further, since the whole of the track adjuster is small in size and unitized, the track frame into which the track adjuster is incorporated can be made small, which leads to a reduction in the weight of the vehicle body. Regarding maintenance, the track adjuster has such an advantage that the unitized track adjuster can be retracted from the track frame for checkup and repair, while being housed in the casing, and this leads to improved workability. Moreover, since the track adjuster is entirely housed in the casing except the electric wiring for the controller, it can be operated without being affected by penetration of earth and sand from outside during vehicle traveling. The track adjuster, which is free from troubles caused by earth and sand penetrating from outside, can stand long use. The operating oil does not leak because a closed structure is employed and therefore the track adjuster can be operated, being free from the influence of the vehicle body.

FIG. 5 diagrammatically shows a track adjuster according to a second embodiment of the invention and its control unit. In the second embodiment, corresponding parts are indicated with the same reference numerals as in the first embodiment and a detailed explanation thereof is skipped.

While the feeding direction of pressure oil to be fed to the tension adjusting cylinder 21 is changed by the switching operation of the direction selector valve 26 in the first embodiment, the second embodiment is arranged such that a bidirectional pump which discharges pressure oil when rotating clockwise and counterclockwise is used as a hydraulic pump 25A and the hydraulic pump 25A is driven forwardly and reversely by the electric motor 25a, thereby changing the feeding direction of pressure oil.

More specifically, the track adjuster 20A of the second embodiment is formed such that discharge ports 40, 41 of the hydraulic pump 25A are connected to an operating oil tank 44 through suction check valves 42, 43 respectively, and the discharge port 40 is connected to the front pressure chamber 23a of the tension adjusting cylinder 21 through the pipe line 28a whereas the discharge port 41 is connected to the rear pressure chamber 23b of the tension adjusting cylinder 21 through the pipe line 28b. In the middle of the pipe line 28b, a check valve 45 is interposed. Extending from the pipe line 28b between the check valve 45 and the rear pressure chamber 23b is a bypass pipe line 28d which is in turn connected to the tank 44. In the bypass pipe line 28d, a relief valve 32 is interposed. Another relief valve 46 is interposed in a pipe line extending from the pressure oil discharge side of the suction check valve 42 to the tank 44.

In the track adjuster 20A of the second embodiment having the above structure, the pressure in the rear pressure chamber 23b of the tension adjusting cylinder 21 is changed by expansion of the crawler belt 15 from its steady state and upon detection of a decrease in the pressure by the hydraulic sensor 27, the hydraulic pump 25A is driven clockwise in response to a command signal from the controller 30. At that time, the hydraulic pump 25A sucks pressure oil from the tank 44 through the suction check valve 42 and the pressure oil is discharged from the discharge port 41 of the hydraulic pump 25A. In consequence, the rear pressure chamber 23b of the tension adjusting cylinder 21 is supplied with the pressure oil, so that the piston 22 of the tension adjusting cylinder 21 advances, with the piston rod front end portion 22a pushing the support yoke 16 and a desired tensioning force can be imparted to the crawler belt 15. Thereafter, when data on the pressure detected by the hydraulic sensor 27 has reached a preset value, the operation of the hydraulic pump 25A is stopped thereby keeping the piston rod in its advancing state.

If a load is rapidly imposed on the crawler belt 15 during vehicle traveling, the controller 30 releases a driving signal to the electric motor 25a for the hydraulic pump 25A in response to a signal from the hydraulic sensor 27 so that the hydraulic pump 25A is driven to rotate counterclockwise. At that time, the hydraulic pump 25A sucks pressure oil from the tank 44 through the suction check valve 43 and discharges the pressure oil from the discharge port 40 thereof. As a result, the front pressure chamber 23a of the tension adjusting cylinder 21 is supplied with pressure oil so that the piston rod of the tension adjusting cylinder 21 moves backward while the idler 12 being moved back by the yoke 16 coupled to the piston rod front end portion 22a and the tension imposed on the crawler belt 15 when tightened is reduced.

Whereas the above discussion has been presented in terms of a track adjuster for a crawler track used in the undercarriage assembly of a work machine such as a bulldozer, it is obvious that the track adjuster of the present embodiment is applicable to other work machines.

Other aspects, objects and effects of the invention become apparent for those skilled in the art when carefully reading the specification, drawings and claims.

What is claimed is:

1. A crawler track tension adjusting device for adjusting tension on a crawler belt of a crawler unit, the device comprising:

(a) a hydraulic actuator which is operable with operating oil to control the tension on the crawler belt, wherein an inflow of the operating oil to the hydraulic actuator is equal to an outflow of the hydraulic oil from the hydraulic actuator such that the hydraulic actuator is operable both in a direction to increase tension on the crawler belt and in a direction to decrease tension on the crawler belt under a same condition;
(b) an electric motor;
(c) a hydraulic pump driven by the electric motor;
(d) an operating condition detector which is disposed in a hydraulic circuit that connects the hydraulic pump to the hydraulic actuator, and which detects an operating condition of the hydraulic actuator; and
(e) a casing housing the hydraulic actuator, the electric motor, the hydraulic pump and the operating condition detector;
wherein the electric motor is controlled in accordance with a signal from the operating condition detector.

2. The crawler track tension adjusting device according to claim 1, wherein the hydraulic actuator comprises a double rod cylinder that includes a cylinder, a piston slidable within the cylinder, and a piston rod including portions located respectively at front and rear ends of the piston.

3. The crawler track tension adjusting device according to claim 2, wherein the piston rod portion located at the front end of the piston projects forward from the cylinder and is coupled to a yoke for supporting an idler about which the crawler belt is wound, and
wherein a pressure active area of a front pressure chamber located in front of the piston is equal to a pressure active area of a rear pressure chamber located behind the piston.

4. The crawler track tension adjusting device according to claim 1, wherein the hydraulic pump comprises an operating oil tank integrally formed therewith.

5. The crawler track tension adjusting device according to claim 1, further comprising:
an electromagnetic direction selector valve disposed in the hydraulic circuit in an oil line which connects the hydraulic pump to the hydraulic actuator,
wherein the operating condition detector comprises a hydraulic sensor disposed in a portion of the oil line which connects the direction selector valve to the hydraulic actuator, and
wherein in response to a signal from the hydraulic sensor, a controller controls the electric motor and the direction selector valve.

6. The crawler track tension adjusting device according to claim 5, wherein the hydraulic circuit including the hydraulic actuator, the direction selector valve and the hydraulic pump has a hermetically closed structure.

7. The crawler track tension adjusting device according to claim 5, wherein the hydraulic pump comprises an operating oil tank integrally formed therewith.

8. The crawler track tension adjusting device according to claim 5, wherein the hydraulic actuator comprises a double rod cylinder that includes a cylinder, a piston slidable within the cylinder, and a piston rod including portions located respectively at front and rear ends of the piston,
wherein the piston rod portion located at the front end of the piston projects forward from the cylinder and is coupled to a yoke for supporting an idler about which the crawler belt is wound,
wherein a stroke sensor which detects a position of the piston rod faces the rear end of the piston rod, and
wherein a positional signal issued by the stroke sensor is input to the controller.

9. The crawler track tension adjusting device according to claim 1, wherein said hydraulic pump comprises a bidirectional pump,
wherein the operating condition detector comprises a hydraulic sensor disposed in an oil line which connects said hydraulic pump to the hydraulic actuator, and
wherein a controller controls the electric motor in response to a signal from the hydraulic sensor.

10. The crawler track tension adjusting device according to any one of claims 1 to 4, wherein two said casings are symmetrically disposed within respective track frames for respectively supporting crawler units disposed at right and left sides of a vehicle.

11. The crawler track tension adjusting device according to claim 9, wherein two said casings are symmetrically disposed within respective track frames for respectively supporting crawler units disposed at right and left sides of a vehicle.

12. A crawler track tension adjusting device for adjusting tension on a crawler belt of a crawler unit, the device comprising:
(a) a hydraulic actuator which is operable with operating oil to control the tension on the crawler belt, wherein an inflow of the operating oil to the hydraulic actuator is equal to an outflow of the hydraulic oil from the hydraulic actuator such that the hydraulic actuator is operable both in a direction to increase tension on the crawler belt and in a direction to decrease tension on the crawler belt under a same condition;
(b) an electric motor;
(c) an operating oil tank storing operating oil;
(d) a hydraulic pump driven by the electric motor;
(e) an operating condition detector which is disposed in a hydraulic circuit that connects the hydraulic pump to the hydraulic actuator, and which detects an operating condition of the hydraulic actuator; and
(f) a casing housing the hydraulic actuator, the electric motor, the operating oil tank, the hydraulic pump and the operating condition detector; wherein the electric motor is controlled in accordance with a signal from the operating condition detector.

* * * * *